US005784209A

United States Patent [19]
Manabe

[11] Patent Number: 5,784,209
[45] Date of Patent: Jul. 21, 1998

[54] MULTI-AXIS OPTICAL LENS

[75] Inventor: Yuji Manabe, Kamakura, Japan

[73] Assignee: Nikon Corporation, Tokyo, Japan

[21] Appl. No.: 650,889

[22] Filed: May 17, 1996

[30] Foreign Application Priority Data

May 25, 1995  [JP]  Japan ................................. 7-152651

[51] Int. Cl.⁶ .............................. G02B 3/02; G02B 3/10
[52] U.S. Cl. ........................... 359/720; 359/708; 359/721
[58] Field of Search ................................ 359/708, 720, 359/721

[56] References Cited

U.S. PATENT DOCUMENTS 5,027,144  6/1991  Ohno ........................................ 359/721
5,159,496  10/1992  Kataoka ................................... 359/754

FOREIGN PATENT DOCUMENTS 7-281095A  10/1995  Japan.

*Primary Examiner*—Georgia Y. Epps
*Assistant Examiner*—Evelyn A. Lester
*Attorney, Agent, or Firm*—Klarquist Sparkman Campbell Leigh & Whinston, LLP

[57] ABSTRACT

An optical lens is disclosed that is suitable for use in a line scanner or analogous device. The lens has multiple optical axes individually corresponding to a respective refractive combination comprising a first and an opposing second refractive surface. The lens is movable, preferably by rotation about an axis, relative to an axis of light propagation so as to permit selection of a desired refractive combination by aligning the optical axis of the refractive combination with the axis of light propagation.

8 Claims, 3 Drawing Sheets

1

MULTI-AXIS OPTICAL LENS

FIELD OF THE INVENTION

This invention pertains to an optical lens, particularly to an optical lens for use with a line scanner.

BACKGROUND OF THE INVENTION

Conventional optical lens assemblies typically have only one optical axis which can be regarded as the axis of light propagation through the lens assembly. Each lens element in such a lens assembly has an opposing pair of lens surfaces (i.e., "refractive surfaces") disposed on the optical axis. Such lens assemblies are used in a seemingly infinite variety of applications.

A line scanner is an optical device that "reads," line-by-line, an image recorded on a medium such as photographic film. With a conventional line scanner, a first conventional lens assembly is used for illuminating the film, and a second conventional lens assembly is used to project each line of the illuminated image on the film onto a line sensor, such as a CCD (charge-coupled device). Thus, by scanning the film line-by-line, the line scanner converts the two-dimensional image on the film into an electrical signal.

A top schematic view of a representative film scanner of conventional type is shown in FIG. 1. The film scanner 10 comprises a line sensor 11, an imaging lens 12, a film 13 containing an image to be scanned, illuminating lenses 14, 15, and a light source 16. Each of the foregoing components is arranged, in the stated order, along an optical axis A that is the Z axis of the film scanner. The line scanner 11 has a normal orientation relative to the axis A, and thus extends in the X and Y directions. The film 13 is also disposed normal to the axis A and is scanned line-by-line, each line extending in the X direction over the entire image extending in the Y direction. The imaging lens 12 is used to project, line-by-line, the image onto the line sensor 11. The illuminating lenses 14, 15 are used to illuminate the film 13 line-by-line in the X direction without imparting any irregularities to the image projected onto the line sensor. The film is typically illuminated by Koehler illumination so that light from the light source 16 reaches the line sensor 11 without irregularities and without loss. To such end, the film scanner 10 is constructed so that an image of the light source is formed inside the pupil face of the imaging lens 12.

A conventional illuminating lens 14, 15 is shaped to have a rectangular aperture that is extended in the X direction, as shown in FIG. 2. The lens has a curved first refractive surface 17, an opposing planar second refractive surface 18, and a single optical axis z.

When attempting to "read" differently sized films, i.e., films 13 having a different length in the X direction, using a film scanner 10 as shown in FIG. 1 without changing the dimensions of the line sensor 11, it is conventionally necessary to change the magnification of the imaging lens 12, e.g., by using a zoom lens as the imaging lens 12, or by selectively using any of several imaging lenses 12 of different magnifications. Unfortunately, every time the magnification of the imaging lens 12 is changed, the position of the pupil of the imaging lens 12 is also changed.

For example, as shown in FIG. 3, a film scanner 20 similar to the film scanner 10 shown in FIG. 1 is used to "read" an image on a film 23 having a shorter "X" dimension than the film 13 in FIG. 1. In FIG. 3, the different magnification of the imaging lens 22 (relative to the magnification of the imaging lens 12 in FIG. 1) results in the position of the pupil of the imaging lens 22 being displaced toward the film 23. As a result, the light source 26 tends to illuminate brightly only the central regions of the film 23, leaving less light intensity at outlying regions on the line sensor 21. Such uneven illumination can cause image irregularities and other optical problems. As shown in FIG. 3, tracing of light rays from the line sensor 21 back to the light source 26 clearly shows that light impinging on the film 23 arises from sources, in addition to the light source 26, outside the dimension of the light source 26. This inherently causes uneven illumination of the film 23 and hence of the line sensor 21.

Continuing further with FIG. 3, in order for light from the light source 26 to reach the line sensor 21 without such irregularities or loss, it is necessary to change the magnification of the imaging lens 22 and, at the same time, change the overall optical characteristics of the illuminating lenses 24, 25 every time the size of the film 23 is changed. I.e., it is typically necessary to replace the illuminating lenses 24, 25 with a different combination of lens elements having a different focal length. Having to replace illuminating lenses is disadvantageous and inconvenient because several combinations of illuminating lenses 24, 25 must be made available, and some mechanism must be provided for exchanging the lenses as required. Moreover, the film scanner 20 itself must be more complex in order to accommodate interchangeable illuminating lenses.

In view of the foregoing, an object of this invention is to provide an illumination lens, for a line scanner or analogous device, having a focal length that can be readily changed, without having to actually replace the illumination lens, to achieve uniform illumination of differently sized films relative to the size of the light source used to illuminate the film.

SUMMARY OF THE INVENTION

The foregoing object is satisfied by the present invention that provides, inter alia, an optical lens suitable for use in a line scanner or analogous device, the lens having multiple optical axes individually corresponding with a respective refractive combination comprising a first and an opposing second refractive surface. The lens is movable relative to an axis of light propagation so as to permit selection of a desired refractive combination by aligning the optical axis of the refractive combination with the axis of light propagation.

According to another aspect of the present invention, the optical lens has a rotational axis. In such an embodiment, the lens is movable about the rotational axis to selectively align the optical axis of a desired refractive combination with the extraneous optical axis. Preferably, in such an embodiment, the first refractive surface in each refractive combination is disposed on one side of the rotational axis and the second refractive surface is disposed on the opposite side of the rotational axis. Also preferably, each refractive combination has a different focal length or other optical property relative to the other refractive combinations provided by the lens.

According to yet another aspect of the present invention, a line scanner is provided that comprises a multi-axis optical lens.

DETAILED DESCRIPTION

According to the present invention, an optical lens is provided, for line scanning or analogous uses, having multiple optical axes each selectively alignable with an axis of light propagation through the lens and each corresponding to a different focal length achievable with the lens. The optical lens preferably is configured as a single optical element having a rotational axis preferably normal to the optical axes of the optical lens and normal to the axis of light propagation. Each optical axis of the lens corresponds to a particular combination of first and second refractive surfaces on the optical lens, each combination usually corresponding to a different focal length. To select a particular refractive combination for use, the orientation of the optical lens about the rotational axis is appropriately changed to align the corresponding optical axis of the refractive combination with the axis of light propagation.

In general, the rotational axis of the optical lens is not parallel with the axis of light propagation. In each "refractive combination" (i.e., combination of first and second refractive surfaces), the first refractive surface is preferably situated on one side of the rotational axis of the optical lens and the second refractive surface is preferably situated on the opposing side of the rotational axis. Alternatively, the optical lens can be configured such that each refractive combination has an optical axis that is parallel to all other refractive combinations of the lens.

Figure 4:
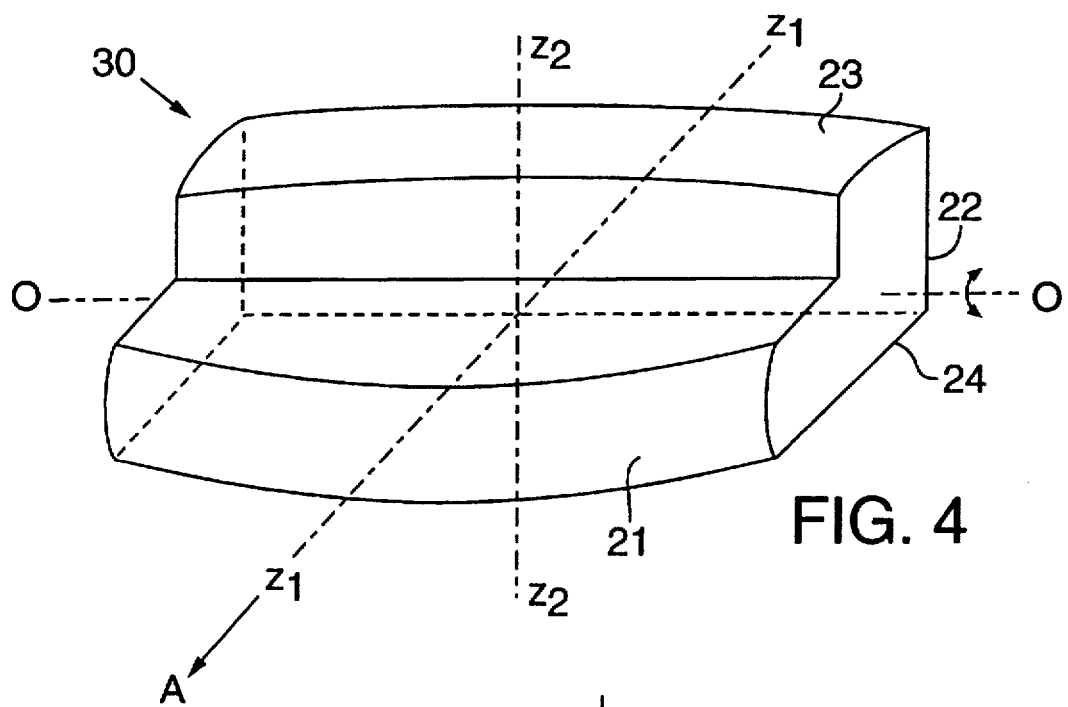
FIG. 4 is a perspective view of a first representative embodiment of an illumination lens according to the present invention providing two refractive combinations and that, to allow selection of one of the refractive combinations as desired, is rotatable 90 degrees about a rotational axis that is oriented normal to the optical axis of the line scanner.

FIG. 4 depicts a representative embodiment of an optical lens 30, according to the present invention, having two refractive combinations. The axis of light propagation through the lens is denoted by A. The rotational axis of the lens 30 is denoted by O, and the lens 30 can be rotated about the rotational axis O to selectively align either the first or second refractive combination with the axis A. Each refractive combination in FIG. 4 comprises a combination of two rectangular aperture, plano-convex refractive surfaces. The first refractive combination is represented by the first optical axis $z_1$ and first and second refractive surfaces 21, 22, respectively, and the second refractive combination is represented by the second optical axis $z_2$ and first and second refractive surfaces 23, 24, respectively.

Figure 5A:
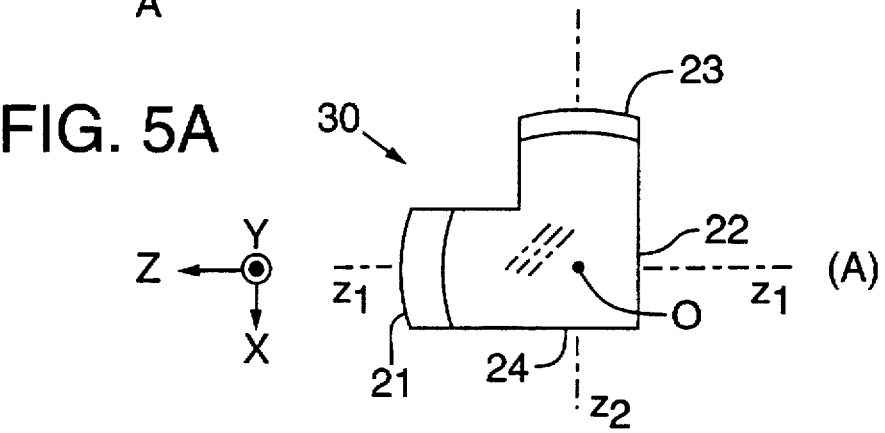
FIGS. 5A and 5B are each an end view of the FIG. 4 embodiment when one or the other refractive combination is selected, respectively.
Figure 5B:
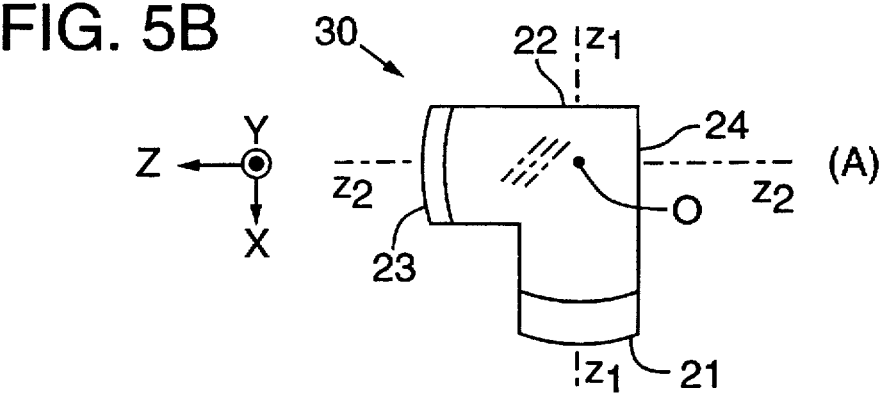

FIGS. 5A and 5B provide end views of the FIG. 4 embodiment in which the rotational axis 0 extends normal to the surface of the page, and the optical axes $z_1$ and $z_2$ are normal to each other and to the rotational axis O. In FIG. 5A, the first optical axis $z_1$ is selected so as to coincide with the axis A. In FIG. 5B, the second optical axis $z_2$ is selected so as to coincide with the axis A. The focal length of refractive surfaces 21, 22 in combination is different from the focal length of refractive surfaces 23, 24 in combination. Thus, using the lens 30 shown in FIGS. 5A and 5B, either of two focal lengths can be selected.

Figure 1:
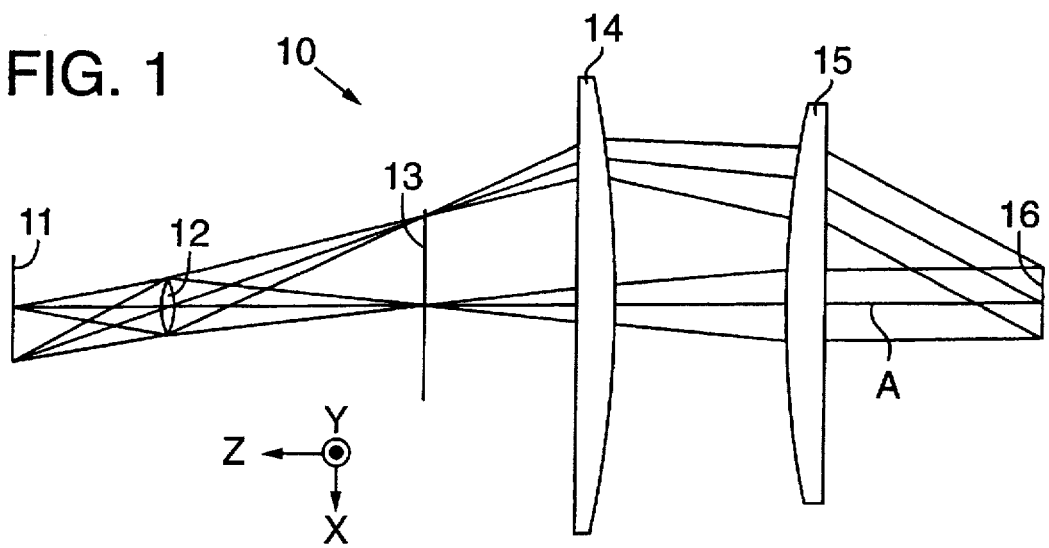
FIG. 1 is an optical schematic diagram, viewed from above, of a prior-art line scanner in which the film being scanned is evenly illuminated by the light source.
Figure 2:
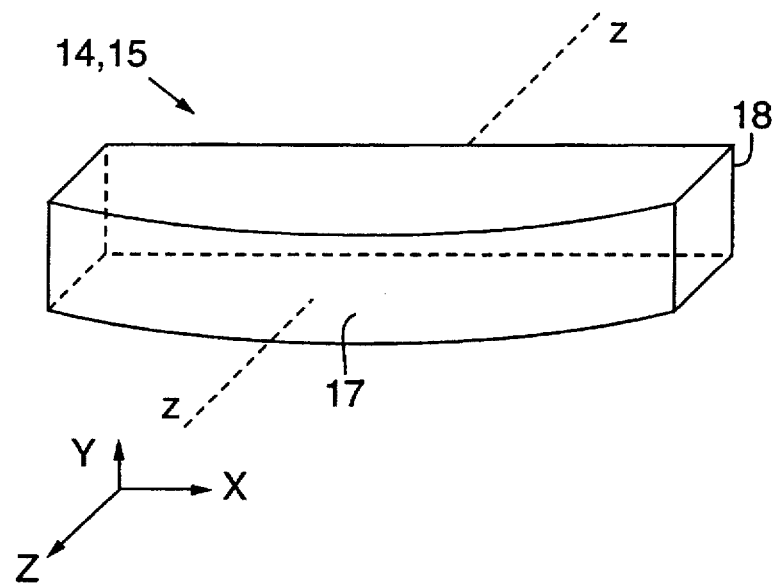
FIG. 2 is a perspective view of a prior-art illumination lens as used in a line scanner.
Figure 3:
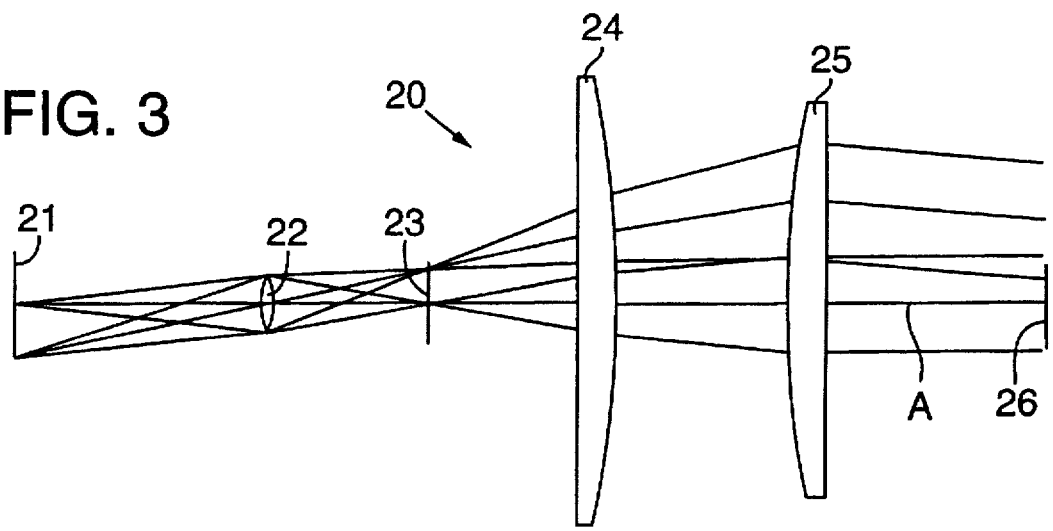
FIG. 3 is an optical schematic diagram, viewed from above, of a prior-art line scanner in which the film being scanned is not evenly illuminated by the light source.

When used with a line scanner as shown in FIG. 1, the optical lens 30 of FIG. 4 can be used in place of the illumination lenses 14, 15. Either the first or the second optical axis $z_1$, $z_2$, respectively, is aligned with the axis A of light propagation extending in the Z direction, and the rotational axis O extends along the X direction. Whenever the focal length of the imaging lens 12 is changed, the focal length of the lens 30 is correspondingly changed simply and easily by rotating the lens 30 ninety degrees about the rotational axis O, thereby ensuring that the film 13 is fully, evenly, and well illuminated.

Figure 6:
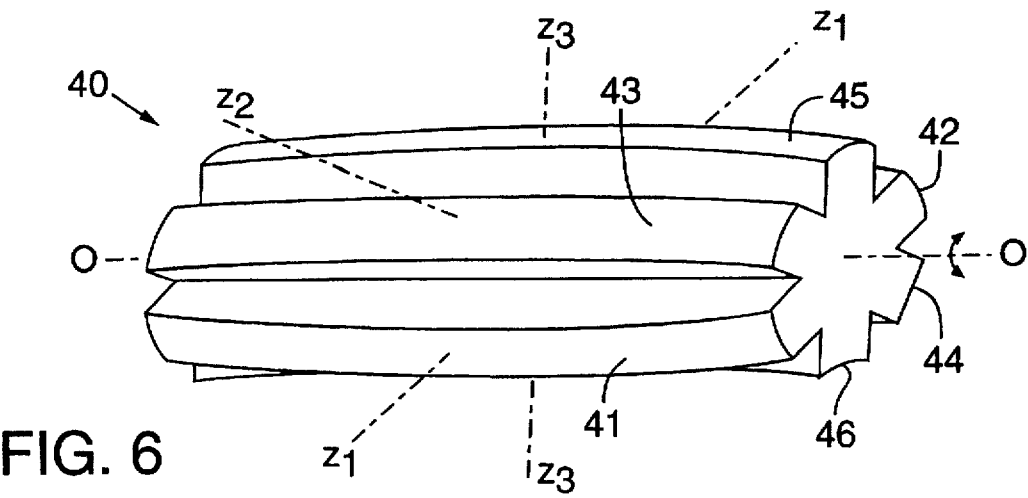
FIG. 6 is a perspective view of a second representative embodiment of an illumination lens according to the present invention providing three refractive combinations and that, to allow selection of one of the refractive combinations as desired, is rotatable 60 degrees about a rotational axis that is oriented normal to the optical axis of the line scanner.
Figure 7:
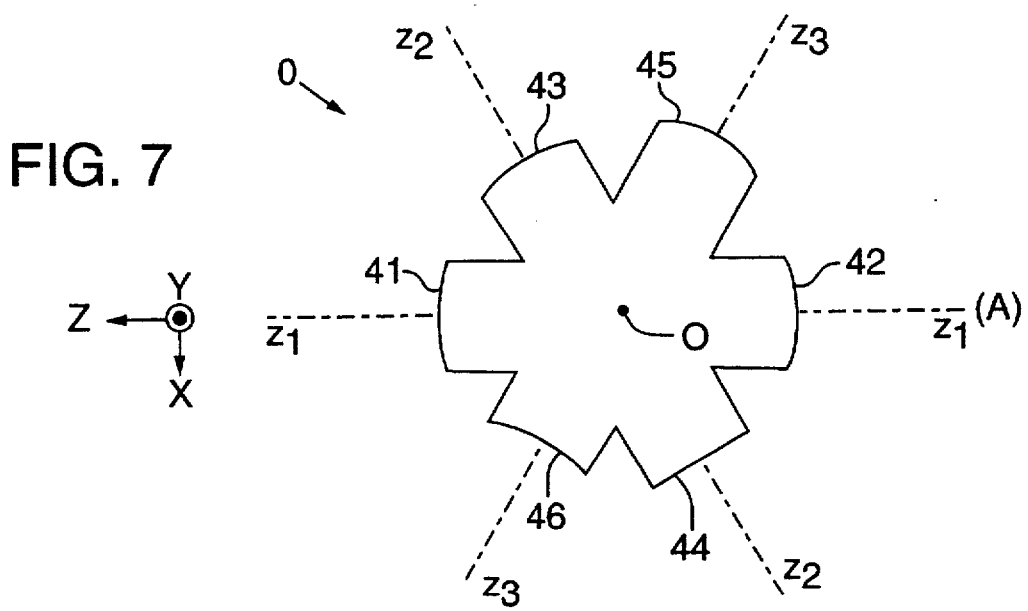
FIG. 7 is an end view of the FIG. 6 embodiment in which one of the refractive combinations is selected.

FIGS. 6 and 7 depict another embodiment of an optical lens 40, according to the present invention, having three refractive combinations. The axis of light propagation is denoted by A. The rotational axis of the lens 40 is denoted by O, and the lens 40 can be rotated about the rotational axis O to selectively align any one of the first, second, and third refractive combinations with the axis A. Each refractive combination has as rectangular aperture and comprises two opposing refractive surfaces. The first refractive combination comprises a convex surface 41 and a convex surface 42, both aligned with the optical axis $z_1$. The second refractive combination comprises a convex surface 43 and a planar surface 44, both aligned with the optical axis $z_2$. The third refractive combination comprises a convex surface 45 and a concave surface 46, both aligned with the optical axis $z_3$.

When used with a line scanner as shown in FIG. 1, the optical lens 40 of FIG. 4 can be used in place of the illumination lenses 14, 15. The first, second, or third optical axis $z_1$, $z_2$, $z_3$, respectively, is aligned with the axis A of light propagation and extends in the Z direction, and the rotational axis O extends in the X direction. Whenever the focal length of the imaging lens 12 is changed, the focal length of the lens 40 is correspondingly changed simply and easily by rotating the lens 40 in 60-degree increments about the rotational axis O, thereby ensuring that the film 13 is fully, evenly, and well illuminated.

Whenever an optical lens according to the present invention has a rotational axis 0 that is not parallel with the axis of light propagation, and one of the lens surfaces in a refractive combination is situated on one side of the rotational axis while the other lens surface in the refractive combination is situated on the other side of the rotational axis, in addition to facilitating easy change of focal length, it is also possible to effectively utilize the interior region of the lens. That is, it is possible to use the same interior region in the lens when using any refractive combination possessed by the lens. This helps to keep the bulk of the lens conveniently small.

A lens surface in any refractive combination is not limited in shape. That is, the lens surface can be, for example, planar, spherical, aspherical, or cylindrical as required.

Furthermore, an optical lens according to the present invention can be made of, for example, molded plastic (e.g., molded acrylic), glass, fused quartz, or other suitable refractive material.

Moreover, an optical lens according to the present invention can be used with any of various line scanners, and is not limited to film scanners.

Preferably, the rotational axis 0 is normal to the axis A of light propagation; however, the two axes need not be perpendicular to each other so long as the optical axes z of the individual refractive combinations are alignable with the axis A. Furthermore, the rotational axis 0 need not intersect the axis A. Also, an optical lens according to the present invention need not be extended in the X dimension and need not have a rectangular aperture. For example, each refractive combination could have a circular aperture. Moreover, as a representative alternative configuration, the optical lens could have a multifaceted "soccer ball" shape wherein opposing pairs of facets serve as individual refractive combinations. Such a "soccer ball" lens would be rotatable about multiple axes in order to selectively align a particular refractive combination with the axis of light propagation.

As yet another alternative embodiment, an optical lens according to the present invention can have multiple refractive combinations having optical axes parallel with each other. With such a lens, changing the refractive combination is performed not by rotating the lens about a rotational axis, but rather by displacing the entire lens (such as in the Y direction) to align the optical axis of the desired refractive combination with the axis of light propagation.

The refractive index of the entire illumination lens can be the same. However, it will immediately be appreciated that the lens can be constructed such that one or more refractive combinations have a different refractive index than other refractive combinations provided by the lens. Similarly, it is possible to configure the lens such that one or more refractive combinations have a different optical characteristic (such as a different spectral characteristic or absorption characteristic) relative to another refractive combination provided by the lens.

With an optical lens according to the present invention, as described above, multiple functions such as multiple focal lengths can be provided in a single lens. Moreover, because selecting a desired refractive combination can be accomplished simply by rotating or displacing the lens relative to the axis of light propagation, the need to provide, for example, multiple illumination lenses is obviated and the apparatus as a whole with which the lens is used is simplified.

Figure 8:
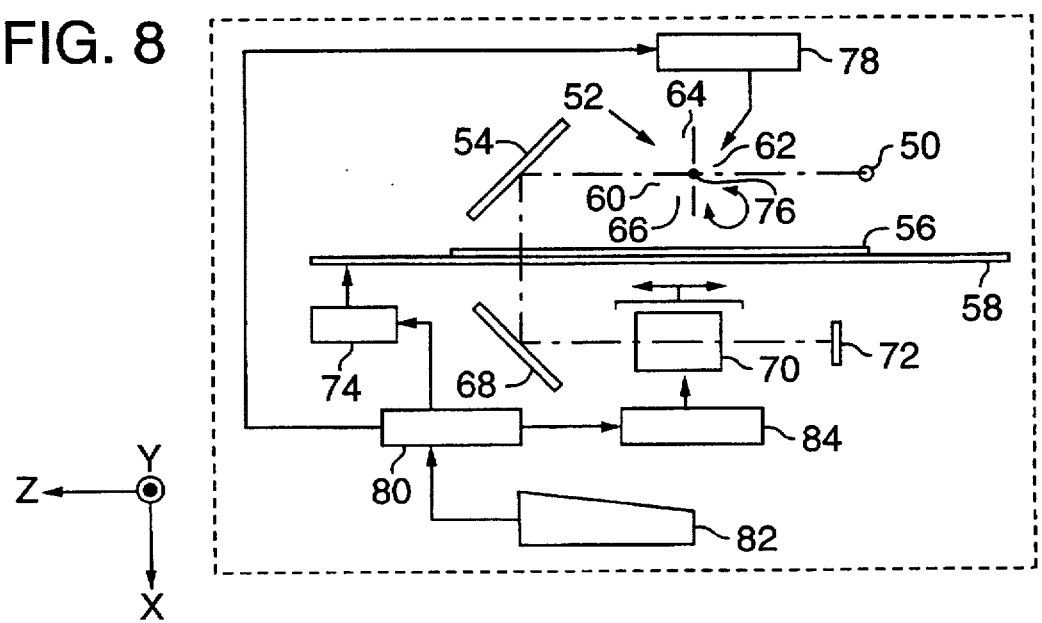
FIG. 8 is a schematic diagram of a film scanner employing an illumination lens as shown in FIG. 4.

An example showing use of an illumination lens according to the FIG. 4 embodiment in a film scanner is shown in FIG. 8, wherein Cartesian coordinates are as indicated. The film scanner of FIG. 8 includes a light source 50, the illumination lens 52, a first prism 54, and a film 56 resting on a carriage 58. The illumination lens 52 provides two refractive combinations, wherein the first refractive combination is created by surfaces 60, 62, and the second refractive combination is created by surfaces 64, 66. For line scanning, the light source 50 can be a fluorescent tube (extending in the Y direction normal to the plane of the paper). Light flux from the light source 50, propagating in the Z direction, passes through and is refracted by the lens 52 (extending in the Y direction normal to the plane of the paper and having characteristics as described above with respect to FIG. 4). The light flux is reflected by the first prism 54 to propagate in the X direction toward the film 56.

Light that passes through the film 56 proceeds further in the X direction and is reflected by a second prism 68 to propagate in the Z direction toward an imaging lens 70. The imaging lens 70 forms an image of the film 56 on a light-receiving surface of a line sensor 72. The line sensor 72 can be, for example, a CCD-type.

The carriage 58 on which the film 56 rests is actuated by a drive mechanism 74 to move in the Z direction for scanning. Thus, as the film 56 is scanned progressively in the ±Z direction, the line sensor 72 "reads" the image on the film 56 line by line.

The illumination lens 52 can be selectively rotated on a rotational axis 76, extending along the Y direction normal to the page, as actuated by an illuminating lens drive 78. The imaging lens 70 is movable along the Z direction as actuated by an imaging lens drive 84. The amount of movement imparted to the illumination lens 52 and the imaging lens 70 by their respective drives is controlled by a controller 80. The controller 80 can be "programmed" using an input terminal 82 which receives, inter alia, instructions and data related to magnification of the film image.

To change magnification of the system shown in FIG. 8, an operator inputs a desired magnification using the input terminal 82. The input terminal 82 provides data signals to the controller 80 corresponding to the desired magnification. Based upon such data signals, the controller 80 calculates an optimal position (along the Z axis) of the imaging lens 70 and actuates the imaging lens drive 84 to move the imaging lens 70 to that position. The controller 80 also determines which refractive combination provided by the illumination lens 52 should be used to refract light from the light source 50. To such end, the controller 80 sends a signal to the illumination lens drive 78 to rotate the illumination lens 52 about the rotational axis 76 as required.

The controller 80 can be equipped or otherwise connected to a memory (not shown) in which data pertaining to desired magnifications of the illumination lens 52 and corresponding optimal Z-axis positions of the imaging lens 70 are stored and retrieved on command using the input terminal 82.

With the apparatus of FIG. 8, the magnification used during reading a film image can be simply and conveniently changed to provide uniform illumination of the film.

It is also possible to replace the imaging lens 70 used in the FIG. 8 apparatus with an optical lens according to the present invention.

While the invention has been described in connection with preferred embodiments, it will be understood that it is not limited to these embodiments. On the contrary, the invention is intended to encompass all alternatives, modifications, and equivalents as may be included within the spirit and scope of the invention as defined by the appended claims.

What is claimed is:

1. An optical lens having multiple optical axes individually corresponding with a respective refractive combination comprising a first and an opposing second refractive surface, the lens being movable relative to an extraneous optical axis so as to permit selection of a desired refractive combination by aligning the optical axis of the refractive combination with the extraneous optical axis, the multiple optical axes intersecting at a location within the lens.

2. The optical lens of claim 1, further comprising a rotational axis, wherein the optical lens is movable about the rotational axis to selectively align the optical axis of a desired refractive combination with the extraneous optical axis.

3. An optical lens having multiple optical axes individually corresponding with a respective refractive combination comprising a first and an opposing second refractive surface, the lens being movable relative to an extraneous optical axis so as to permit selection of a desired refractive combination by aligning the optical axis of the refractive combination with the extraneous optical axis, the lens further comprising a rotational axis about which the optical lens is movable to selectively align the optical axis of a desired refractive combination with the extraneous optical axis, wherein, in each refractive combination, the first refractive surface is disposed on one side of the rotational axis and the second refractive surface is disposed on the opposite side of the rotational axis.

4. The optical lens of claim 2, wherein the rotational axis is not parallel with the extraneous optical axis.

5. The optical lens of claim 1, wherein each refractive combination has a different focal length.

6. An apparatus for providing uniform illumination of surfaces of varying size, comprising a light source, a surface to be illuminated, and the lens of claim 1 positioned on an optical path between the light source and the surface to be illuminated.

7. The apparatus of claim 6 wherein the surface to be illuminated is a line of an object to be scanned.

8. A line scanner comprising the optical lens of claim 1.

* * * * *

UNITED STATES PATENT AND TRADEMARK OFFICE
CERTIFICATE OF CORRECTION

PATENT NO. : 5,784,209

DATED : July 21, 1998

INVENTOR(S) :
YUJI MANABE

It is certified that error appears in the above-indentified patent and that said Letters Patent is hereby corrected as shown below:

Column 1, line 35, a comma --,-- should be inserted after "direction" and before "over".

Column 3, line 67, column 4, line 47, and column 5, lines 1 and 5, "axis 0" should be --axis O--.

Signed and Sealed this

Fifth Day of October, 1999

Attest:

Q. TODD DICKINSON

Attesting Officer

Acting Commissioner of Patents and Trademarks